July 28, 1959  P. E. GRAHAM ET AL  2,897,066
ELECTRICAL CAPACITORS
Filed Oct. 12, 1956
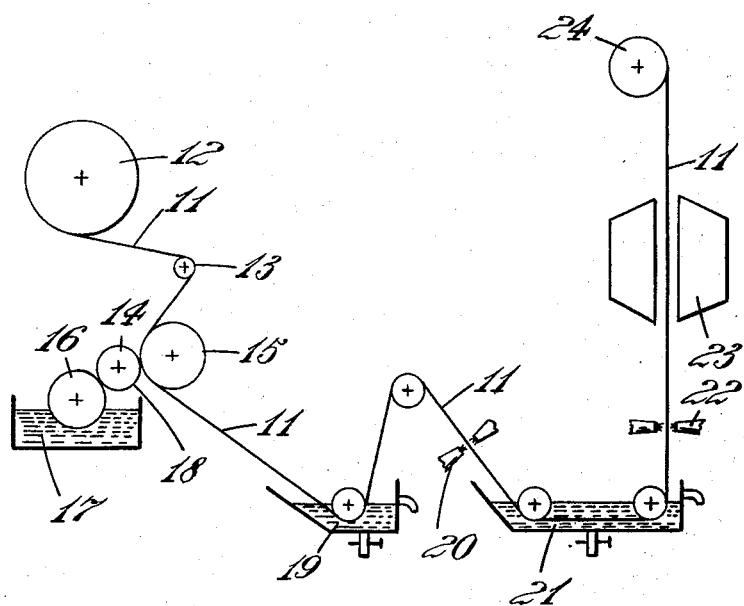
INVENTORS
PETER E. GRAHAM
RONALD C. SMITH
By
Watson, Cole, Grindle & Watson
ATTORNEYS

United States Patent Office 2,897,066
Patented July 28, 1959

2,987,066

ELECTRICAL CAPACITORS

Peter Edward Graham and Ronald Christopher Smith, Wandsworth, London, England, assignors to A. H. Hunt (Capacitors) Limited, London, England, a British company Application October 12, 1956, Serial No. 615,669

1 Claim. (Cl. 41—42)

This invention comprises improvements in or relating to electrical capacitors. It is concerned with capacitors, chiefly roll capacitors, of the kind wherein the dielectric comprises flexible strip material having a thin coating of metal deposited on one or both its surfaces to act as an electrode or electrodes, or wherein similar metal-coated flexible insulating strip is used in the make-up of capacitors but the strip does not itself perform duty as dielectric but is simply employed as a carrier of the metal.

With such capacitors it is normally necessary to render certain areas of the dielectric or carrier strip free of metal. Thus, in the case of roll capacitors comprising more than one length of dielectric strip each metallised on one face and wound together, or when the dielectric is metallised on both faces, this is normally done to provide a metal-free edge margin or margins in order to prevent short-circuiting between different metal layers over the edges of the strip, as explained in British Patent No. 563,080. Again in the case of a capacitor wound from a single strip of dielectric bearing a castellated pattern of metallised areas to provide two electrodes on one surface, as described in British Patent No. 647,573, a narrow deviating metal-free band must be obtained along the strip.

Hitherto, metal-free areas have been obtained by electrical demetalizing technique in the manner described in the specifications of the above-mentioned patents. It has also been proposed to achieve a similar effect by masking selected areas of the strip during deposition of the metal coating.

The present invention contemplates the forming of metal-free areas on the metal coated dielectric or carrier strip by the action of a chemical reagent or reagents. The method may comprise the steps of first completely metalizing the dielectric or carrier strip over at least one surface, removing the undesired areas of metal by treating them selectively with a chemical reagent or mixture of reagents which will attack or dissolve the metal without significantly affecting the dielectric or carrier material, and then removing the residual products of the reaction and any excess of reagent by washing.

There are a variety of reagents that will attack thin metal films, for example hydrochloric acid, sodium hydroxide and so forth, but the preferred reagent in the present connection is sodium hydroxide. The metal coating may be of aluminium carried on a dielectric strip of polyethylene terephthalate.

The following is a description of one method of carrying the invention into effect, given by way of example, and with reference to the accompanying diagrammatic drawing. The flexible strip material to be treated is polyethylene terephthalate dielectric which has been previously metalized with aluminium all over one face. The strip 11 is drawn off from a supply spool 12 whence it passes over a guide roller 13 and then through the nip between a demetalizing roller 14 and a backing roller 15 which keeps the strip in contact with the demetalizing roller. The demetalizing roller 14 is in contact with a transfer roller 16, which is somewhat below the demetalizing roller and has its lower part dipping into a bath 17 of 60% sodium hydroxide solution. The strip 11 passes with its metalized surface against the demetalizing roller, and the cylindrical surface 18 of the roller bears a pattern in relief, the raised parts of the pattern corresponding to those areas of the roller surface that come into contact with the areas of the strip that it is desired to demetalize. Therefore, said areas of the strip have applied to them a film of the sodium hydroxide reagent drawn up from the reagent bath 17 by the transfer roller 16.

The strip 11 passes on to a tank 19 of wash water but before it enters the wash tank the sodium hydroxide demetalizing reagent has time to act on the metalization and dissolve it at those places which have been coated with the reagent. The residue of the reaction and any excess sodium hydroxide is mainly removed in the wash tank, and the washing is completed by water sprays 20 which are directed on to the surfaces of the strip after it leaves the wash tank. The strip 11 then passes through a second longer wash tank 21 and between further water sprays 22. These sprays are positioned above the wash tank so that the water from them replenishes the tank which has a continuous overflow to prevent it from containing too high a concentration of reaction products and unused reagent.

Afterwards, the strip 11 is passed through infra red drying cabinets 23 and then wound on to a take-up spool 24 which can subsequently be used as a supply reel in the manufacture of roll capacitors.

Increased production is obtained by treating a wide web of the strip material by employing a plurality of transfer rollers side by side, or a single long roller bearing a plurality of patterns, and afterwards slitting the web longitudinally into individual strips.

The solution of sodium hydroxide reagent may, if desired, have its viscosity increased, for example by the addition of a substance such as sodium silicate to improve the adherence of the reagent to the metalized areas of the strip and give a cleaner edge to the demetalized areas; preferably the viscosity is increased to a value somewhat greater than 800 centistokes. The term "centistoke" as a unit of viscosity is quite well known. Dynamic viscosity is expressed in dyne-seconds per $cm.^2$ or poises (the derived unit for low viscosities is the centipoise). Kinematic viscosity is expressed in "stokes" (the derived unit is the centistoke) and is obtained by dividing the dynamic viscosity by the density of the material. In this way a clean sharp pattern of demetalized areas is obtained which compares favourably with results achieved by electrical demetalization or masking.

The dielectric or carrier strip bearing the metalization need not be polyethylene terephthalate, but can be any other synthetic plastic material, or indeed any flexible strip insulating material that has sufficient resistance to the action of the demetalizing reagent. Paper strip can be treated if the surfaces of the paper are firstly suitably protected by a coat of lacquer or varnish. It is also to be noted that this chemical method can be used to treat comparatively rough-surfaced strip materials which would not be amenable to treatment by electrical demetalization; for example, woven material such as a strip of glass cloth could be used for carrying the metalization.

It will be understood that the speed at which the strip or web can be run through the demetalizing apparatus is governed by the consideration that sufficient time must be given for the demetalizing reagent to act during the passage of the strip between the transfer roller and the wash tank. Consequently, if this distance is increased the apparatus can be speeded up without affecting the quality of the demetalization.

There are methods other than that already described for applying the demetalizing reagent to the selected areas on the strip. Thus, if the viscosity of the reagent were adjusted to be of the same order as that of printer's ink, it would no doubt be possible to employ any of the conventional methods of application from rolls or galleys that are used in the printing industry, or silk screen printing could be employed. Another way would be to protect the areas of the strip on which the metalization was to be retained by the application of a lacquer or varnish, and then to pass the whole of the strip through the reagent bath.

We claim:

A method of preparing flexible electrode-bearing strip material for making capacitors, comprising the steps of depositing a thin layer of aluminium metalization onto at least one surface of a carrier strip, delimiting electrode areas on the metalized surface by applying a solution of sodium hydroxide, having a concentration of approximately 60% by weight and a viscosity of approximately 800 centistokes to selected areas of said metalized surface by means of a demetalizing roller having a periphery patterned to correspond to the areas of metalization to be removed, removing the residual products of reaction and any excess of reagent by washing, and drying the thus prepared strip.

References Cited in the file of this patent

UNITED STATES PATENTS

| | | |
|---|---|---|
| 1,909,079 | Steerup | May 16, 1933 |
| 2,168,909 | Mason | Aug. 8, 1939 |
| 2,530,436 | Maleyre | Nov. 21, 1950 |